Figures 1, 2:
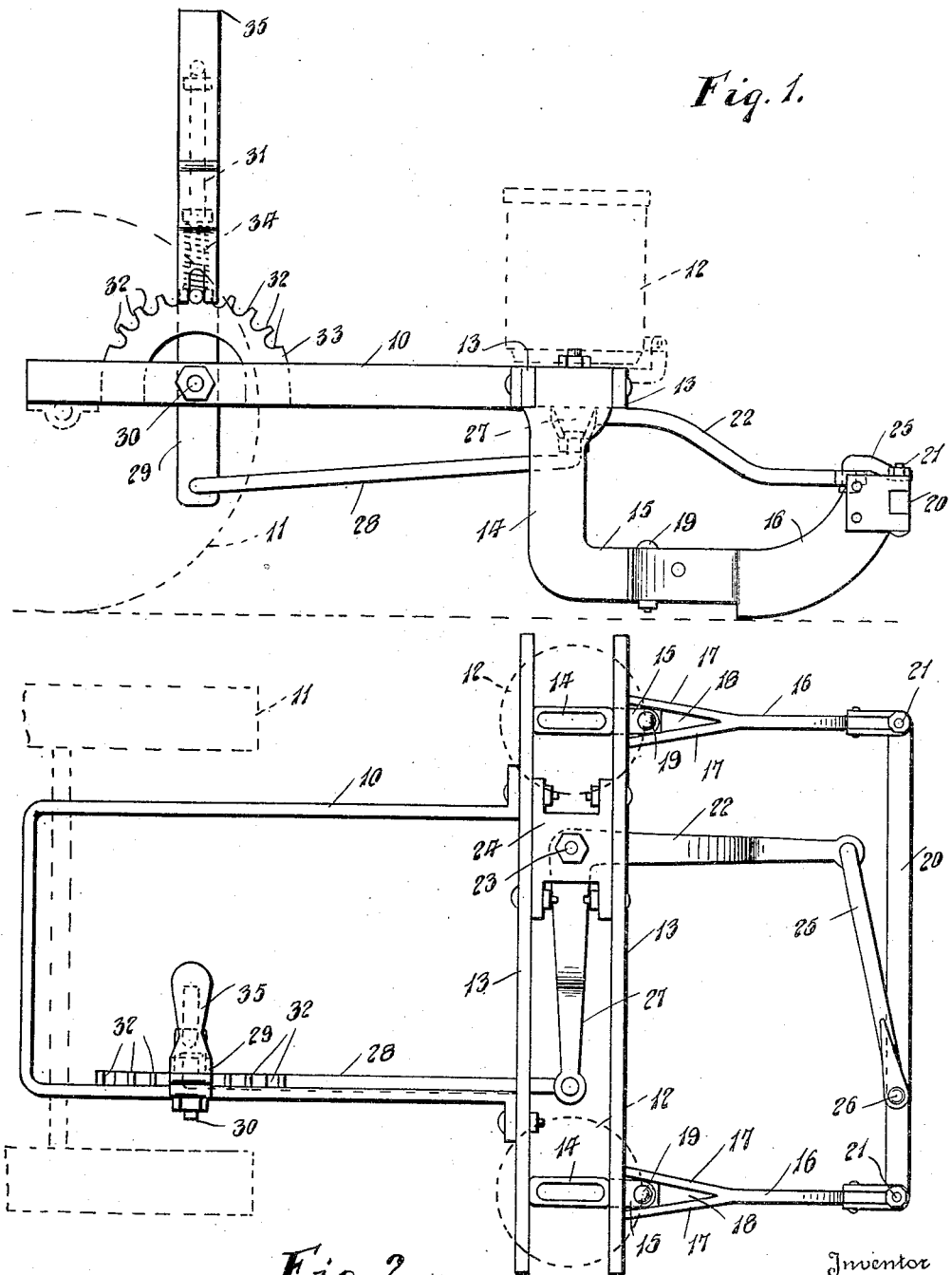

Feb. 21, 1933.  F. WATERMAN  1,898,920
STEERING DEVICE FOR PLANTERS
Filed May 26, 1932  2 Sheets-Sheet 1

Inventor
F. Waterman.
By L. F. Randolph, Jr.
Attorney

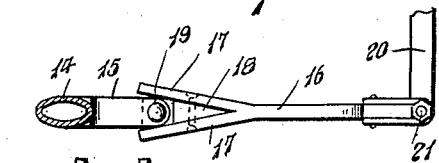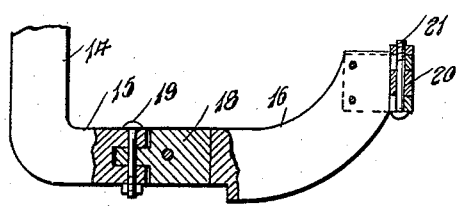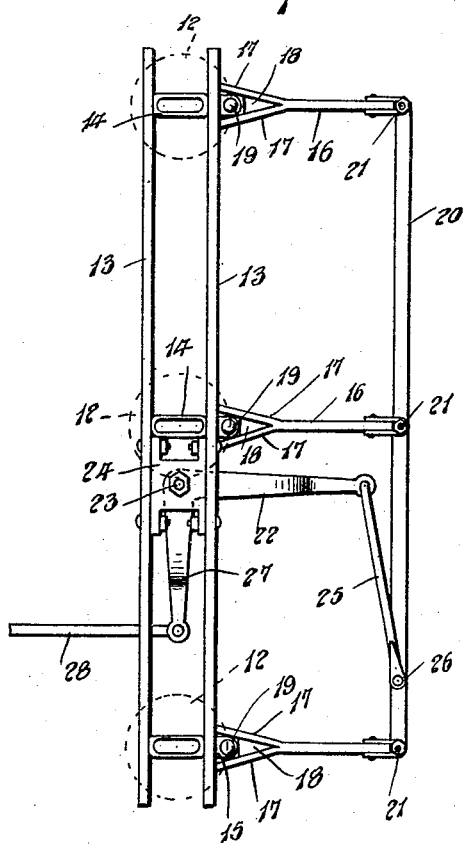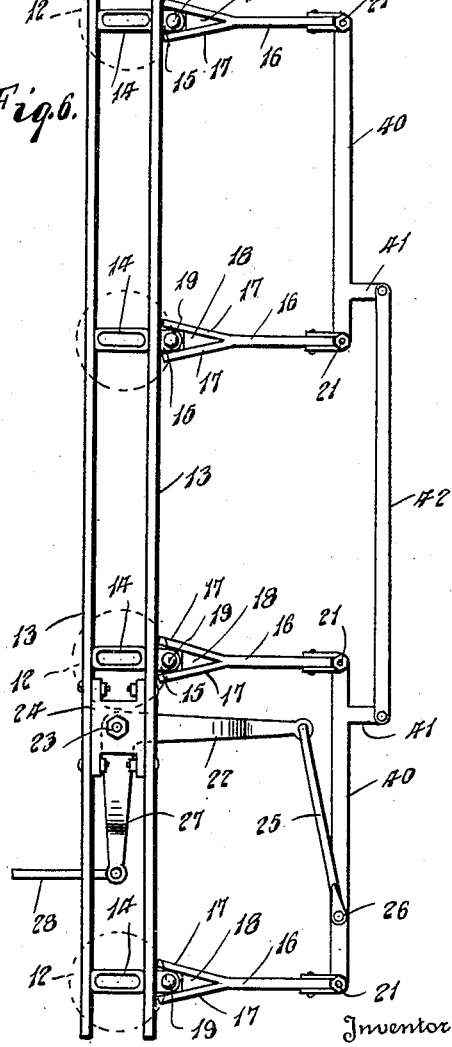

Patented Feb. 21, 1933

1,898,920

UNITED STATES PATENT OFFICE

FRED WATERMAN, OF WINNEBAGO, NEBRASKA

STEERING DEVICE FOR PLANTERS

Application filed May 26, 1932. Serial No. 613,729.

The invention relates to seed droppers or planters such for instance as corn or cotton planters or the like, and has for its object the provision of means whereby the machine may be steered to obviate or overcome the tendency of the machine to slide downhill in sidehill planting so as to make the rows always parallel and substantially straight.

A further object of the invention is the provision of means applied to a seed planter whereby the shoes in advance of the dropping tubes are mounted to swing on vertical pivots and providing means for holding the shoes in adjusted positions relatively to the planting means for the purpose stated.

The invention will be described in detail hereinafter and will be found illustrated in the accompanying drawings, in which Figure 1 is a side view of my improved steering means showing the device applied to a planting mechanism, Figure 2 is a top plan view, Figure 3 is a detail of one of the shoes shown partly broken away and in section, and applied to a seed dropping tube, Figure 4 is a top plan view of one of the steering units, Figure 5 is a top plan view of the adaptation of steering mechanism to a three row planter, Figure 6 is a similar view showing an adaptation to a four row planter.

In the drawings similar reference characters are used to designate corresponding parts throughout the several views.

The planter includes a frame 10 having traction wheels 11, and seed boxes 12 mounted on cross beams 13. The seed dropping tubes 14 are provided with forwardly directed horizontal portions 15. 16 designates the shoes having their rear portions bifurcated and extended at an angle to one another as shown at 17. Secured between the angle members 17 are triangular blocks 18 that are hingedly secured to the horizontal portions 15 as shown at 19. The forward ends of the shoes 16 are connected by means of a rod 20 pivotally connected as shown at 21 to said shoes. 22 designates a bell crank lever fulcrumed as shown at 23 on a block 24 secured between the beams 13 and having one of its arms connected by means of a link 25 with the rod 20 and pivoted thereto as shown at 26. The other arm of the lever 27 is connected by means of a link 28 with an operating lever 29. The lever 29 is fulcrumed as shown at 30 on one of the beams of the frame 10, and has a finger latch 31 that engages in notches 32 in a segmental rack 33 to hold the operating lever 29 and the shoes 16 in adjusted position. 34 designates a spring to normally hold the finger latch in engagement with the segmental rack, and 35 an operating handle for the lever.

In Figure 5 is shown an adaptation of the mechanism for use with a three row planter, the parts being the same as in Figures 1 and 2, except that the rod 20 is connected with all three of the shoes.

In Figure 6 is shown the adaptation of the invention to a four row planter, in which the shoes 16 are connected in pairs by means of rod 40, having lugs or projections 41 that are in turn connected by a rod 42 so that movement of the bell crank lever will through the link 25 actuate the four shoes simultaneously.

As hereinbefore stated the invention is provided to overcome the tendency of the machine to slip downhill in sowing seed on a sidehill, it being apparent that by adjusting the shoes to the hill that this tendency will be overcome, and the shoes may be fixedly adjusted by means of the finger latch 31 engaging in the proper notch on the segment 33, it being apparent that because of the plurality of the notches 32 on each side of the center notch that a fairly accurate adjustment may be made.

What is claimed is:—

1. In a seed planter having seed dropping tubes, shoes pivotally connected to said tubes, and means to adjust said shoes on their pivots.

2. In a seed planter having seed dropping tubes, shoes pivotally connected to said tubes, and means to simultaneously adjust the shoes on their pivots.

3. In a seed planter having seed dropping tubes, shoes pivotally connected to said tubes, a rod connecting the free ends of the shoes, an operating lever, and operative means connecting said lever and rod.

4. In a seed planter having seed dropping tubes, shoes pivotally connected to said tubes, a rod connecting the free ends of the shoes, an operating lever, a bell crank lever, a link connecting one arm of said lever with the rod, an operating lever, and a link connecting said operating lever and another arm of said bell crank lever.

5. In a seed planter having seed dropping tubes, shoes pivotally connected to said tubes, said shoes having their pivoted portions bifurcated, pivot blocks secured between the furcated arms, said arms extending beyond the pivots and providing stops limiting the pivotal movement of the shoes, and means to adjust the shoes on their pivots.

In testimony whereof I affix my signature.

FRED WATERMAN.